(12) United States Patent
Al-Harthi et al.

(10) Patent No.: US 8,604,115 B1
(45) Date of Patent: Dec. 10, 2013

(54) ETHYLENE/PROPYLENE COPOLYMER NANOCOMPOSITE

(71) Applicant: King Fahd University of Petroleum and Minerals, Dhahran (SA)

(72) Inventors: Mamdouh Ahmad Al-Harthi, Dhahran (SA); Omer Yahya Bakather, Dhahran (SA); Sadhan Kumar De, Dhahran (SA); Reyad Awwad Khalaf Shawabkeh, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 13/789,482

(22) Filed: Mar. 7, 2013

(51) Int. Cl.
C08K 5/09 (2006.01)
C08F 4/18 (2006.01)

(52) U.S. Cl.
USPC ............. 524/400; 524/413; 524/570; 526/95; 526/97; 526/103; 526/107

(58) Field of Classification Search
USPC ............. 524/400, 413, 570; 526/95, 97, 103, 526/107
See application file for complete search history.

(56) References Cited

U.S. PATENT DOCUMENTS

| | | | |
|---|---|---|---|
| 5,744,535 A | 4/1998 | Akagawa et al. | |
| 6,835,769 B2 * | 12/2004 | Custodero et al. | 524/497 |
| 6,963,018 B2 | 11/2005 | Vasileiadis et al. | |
| 7,145,051 B2 | 12/2006 | Ou et al. | |
| 7,678,726 B2 | 3/2010 | Jacobsen et al. | |
| 7,989,535 B2 | 8/2011 | Nakagawa et al. | |
| 2007/0023735 A1 | 2/2007 | Biscoglio et al. | |
| 2010/0062928 A1 * | 3/2010 | Jin et al. | 502/159 |
| 2011/0190118 A1 | 8/2011 | Schulz et al. | |
| 2011/0224329 A1 | 9/2011 | Gong et al. | |

FOREIGN PATENT DOCUMENTS

EP     0 422 452 A2     4/1991

OTHER PUBLICATIONS

Wu, J.-Q., et al., "Synthesis, Structural Characterization, and Ethylene Polymerization Behavior of the Vanadium(III) Complexes Bearing Salicylaldiminato Ligands". Organometallics, 2008. 27(15): p. 3840-3848.
Alexandre, Michael et al., "Polymer-Layered Silicate Nanocomposites: Preparation, Properties and Uses of a New Class of Materials", Polymer, 2002, 43:2123-2132.
Stephens, C.H. et al., "Comparison of Propylene/Ethylene Copolymers Prepared with Different Catalysts", Journal of Applied Polymer Science, 2006, 100:1651-1658.

* cited by examiner

*Primary Examiner* — Peter D Mulcahy
(74) *Attorney, Agent, or Firm* — Richard C. Litman

(57) ABSTRACT

The ethylene/propylene copolymer nanocomposite is a copolymer prepared by inclusion of a filler of nanoparticles of titania doped with iron that permits control over, and variation of, the overall polymeric properties. Through the addition of the $TiO_2$/Fe nanofiller, the concentration of polypropylene in the copolymer is increased and the overall crystallinity is decreased. In order to make the copolymer, a $TiO_2$/Fe titania-iron nanofiller is first mixed with a polymerization catalyst (a vanadium (III) complex bearing bidentate salicylaldiminato ligands) in a reactor. The reactor is then charged with solvent (e.g., toluene) and heated to a temperature suitable for polymerization, e.g., about 30° C. Following heating, a mixture of ethylene and propylene gases (in selected molar ratios) is fed into the reactor at a fixed pressure, and methyl aluminum dichloride co-catalyst (MADC) is added to initiate polymerization. Polymerization is quenched to yield the ethylene/propylene copolymer nanocomposite, which is then washed and dried.

19 Claims, 7 Drawing Sheets

ETHYLENE/PROPYLENE COPOLYMER NANOCOMPOSITE

BACKGROUND OF THE INVENTION

1. Field of the Invention

The present invention relates to polyolefin nanocomposites, and particularly to an ethylene/propylene copolymer nanocomposite having titania-iron nanofillers in order to increase the concentration of polypropylene in the copolymer and decrease crystallinity of the copolymer.

2. Description of the Related Art

Ethylene polymerization is a well-known process, and is conventionally performed using free-radical polymerization, the Zeigler-Natta catalyst technique, the Phillips catalyst technique, the metallocene catalyst technique, and the post-metallocene catalyst technique. Polyolefin nanocomposites are of great interest due to their mechanical and thermal properties. It has been found that addition of nanoparticles, such as titanium dioxide, doped titanium, silicon dioxide, aluminum trioxide and zirconium dioxide, may improve the polymer properties of such composites.

$TiO_2$-filled polymers have been prepared by solution mixing, melt compounding and in situ polymerization. In situ polymerization is considered to be the most promising method, as it provides a homogeneous dispersion of the filler in the polymer matrix. Although $TiO_2$-filled polymers are known, the properties of such composite materials are fixed. It would be desirable to provide a method for doping the titania nanofiller material that permits control over and variation of the overall polymeric properties, such as polyolefin composition in the final product, crystallinity and the like.

Thus, an ethylene/propylene copolymer nanocomposite solving the aforementioned problems is desired.

SUMMARY OF THE INVENTION

The ethylene/propylene copolymer nanocomposite is a copolymer prepared by inclusion of a filler of nanoparticles of titania doped with iron that permits control over, and variation of, the overall polymeric properties. Through the addition of the $TiO_2$/Fe nanofiller, the concentration of polypropylene in the copolymer is increased and the overall crystallinity is decreased. In order to make the copolymer, a $TiO_2$/Fe titania-iron nanofiller is first mixed with a polymerization catalyst (a vanadium (III) complex bearing bidentate salicylaldiminato ligands) in a reactor. The reactor is then charged with solvent (e.g., toluene) and heated to a temperature suitable for polymerization, e.g., about 30° C. Following heating, a mixture of ethylene and propylene gases (in selected molar ratios) is fed into the reactor at a fixed pressure, and methyl aluminum dichloride co-catalyst (MADC) is added to initiate polymerization. Polymerization is quenched to yield the ethylene/propylene copolymer nanocomposite, which is then washed and dried.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 8:
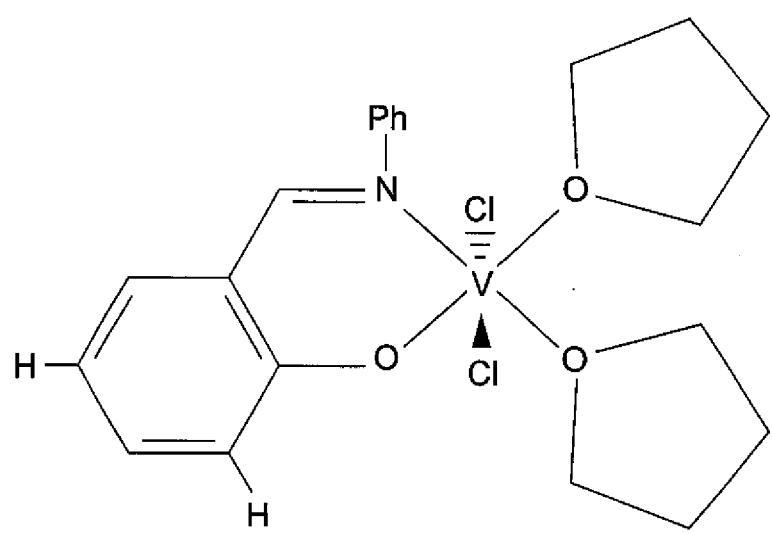
FIG. 8 is the structural formula of the catalyst composed of vanadium (III) complex with bidentate salicylaldiminato ligands used in a method of making an ethylene/propylene copolymer nanocomposite according to the present invention.

The ethylene/propylene copolymer nanocomposite is a copolymer prepared by inclusion of a filler of nanoparticles of titania doped with iron that permits control over, and variation of, the overall polymeric properties. As will be shown below, through the addition of a $TiO_2$/Fe nanofiller, the concentration of propylene in the copolymer is increased, and the overall crystallinity of the copolymer is decreased. In order to make the ethylene/propylene copolymer nano composite, a polymerization catalyst is first prepared. The catalyst is a vanadium (III) complex bearing salicylaldiminato ligands of the general class $[RN{=}CH(ArO)]VCl_2(THF)_2$ where Ar is $C_6H_4$ and R=Ph, and more particularly, having the formula shown in FIG. 8. The catalyst was synthesized by conventional methods, such as that taught in Wu, J.-Q., et al., "Synthesis, Structural Characterization, and Ethylene Polymerization Behavior of the Vanadium(III) Complexes Bearing Salicylaldiminato Ligands", Organometallics, 2008, 27(15): p. 3840-3848 (in particular, the catalyst is designated catalyst 2a in the Wu article, shown in Scheme 1 at p. 3841), which is hereby incorporated by reference in its entirety.

In this procedure, $VCl_3(THF)_3$ (0.75 g) was dissolved in dried tetrahydrofuran (20 mL) and added slowly to a solution of 2-(PhNCH)$C_6H_4$OH (0.40 g) in tetrahydrofuran (20 mL) to form a red mixture. This mixture was stirred for 10 min, after which $Et_3N$ (0.3 mL, 216 mg) was added and stirred for 4 hours at room temperature. Finally, the solution was concentrated to about 10 mL, and then the mixture was filtered to remove NH$_4$Cl. Red-black crystals formed by diffusion of n-hexane (20 mL) into the solution, thus producing the vanadium (III) complex bearing salicylaldiminato ligands shown in FIG. 8 that is used as the polymerization catalyst.

As a control, undoped titania nanofillers were synthesized, in addition to nanofillers formed from iron-doped titania. The undoped titania nanofillers were synthesized by a modified sol-gel process under constant sonication. About 500 μL of titanium (IV) alkoxide precursor in 15 mL of ethanol was hydrolyzed in the presence of 1 mL of water at room temperature to form a white solution of hydrolyzed titania particles. For the iron-doped titania nanofillers, 5 mL of an ethanolic solution of an inorganic precursor Fe(NO$_3$)$_3$.9H$_2$O (1% solution) was added to the hydrolyzed titania solution under constant sonication. The reaction mixture was sonicated for 30 minutes. Following sonication, the precipitate was washed with ethanol multiple times to remove excess NO$_3^-$ and Fe$^{3+}$. The precipitate was dried overnight at 100° C., and then heated for 5 hours to convert the amorphous titania into the crystalline anatase form. Finally, the product was ground into a fine powder having a particle size less than 10 nm.

Ethylene/propylene co-polymerizations were carried out in a 250 mL round-bottom flask equipped with a magnetic stirrer. A 1.8 mg portion of the catalyst (prepared in advance, as described above) and an amount of the TiO$_2$/Fe nanofiller were added to the flask, and the reactor was charged with toluene (80 mL). As will be described below, for purposes of experimental testing, the amount of the TiO$_2$/Fe nanofiller was varied between 5 and 15 mg. A sample with no nanofiller was also prepared as a control.

The flask was then immersed in an oil bath, and when the reactor temperature was equilibrated with the bath oil temperature (30° C.), nitrogen gas was removed using a pump vacuum. Following nitrogen removal, a mixture of ethylene and propylene gases (in selected molar ratios) was fed into the reactor with a fixed input pressure of 1.3 bar. As described below with reference to Table 1, the molar ethylene to propylene ratio was varied between 50:50 and 60:40 in our experiments. After 10 minutes of saturation of ethylene/propylene in toluene, 1 mL of a methyl aluminum dichloride (MADC) co-catalyst was introduced into the reactor to initiate in situ polymerization. The polymerization reaction was quenched by adding 250 mL of methanol containing HCl (5 vol %). Finally, the polymer was washed with an excess amount of methanol and dried in an oven at 50° C. for 24 hours.

Table 1 below summarizes the ethylene to propylene molar ratio, the percentage of polypropylene present in the resultant nanocomposite, and the percent of crystallinity of polypropylene samples prepared as described above with the TiO$_2$/Fe nanofiller varied between 5 and 15 mg, along with a control sample of the ethylene/propylene mixture having no nanofiller. As can be seen in Table 1 below, 15 mg. of the TiO$_2$/Fe nanofiller with an ethylene to propylene molar ratio (E/P) of 60:40 results in a maximum concentration of polypropylene in the resultant nanocomposite with a minimum of crystallinity.

TABLE 1

Polypropylene Properties as a Function of Nanofiller Content

| Entry | TiO$_2$/Fe (mg) | E/P (mol/mol) | Poly C$_3$H$_6$ % | % of Crystallinity |
|---|---|---|---|---|
| 1 | 0 | 50/50 | 0.0 | 52.0 |
| 2 | 15 | 50/50 | 4.1 | 39.0 |
| 3 | 0 | 60/40 | 3.7 | 40.0 |
| 4 | 5 | 60/40 | 9.1 | 38.0 |
| 5 | 15 | 60/40 | 25.0 | 31.0 |

Figure 1:
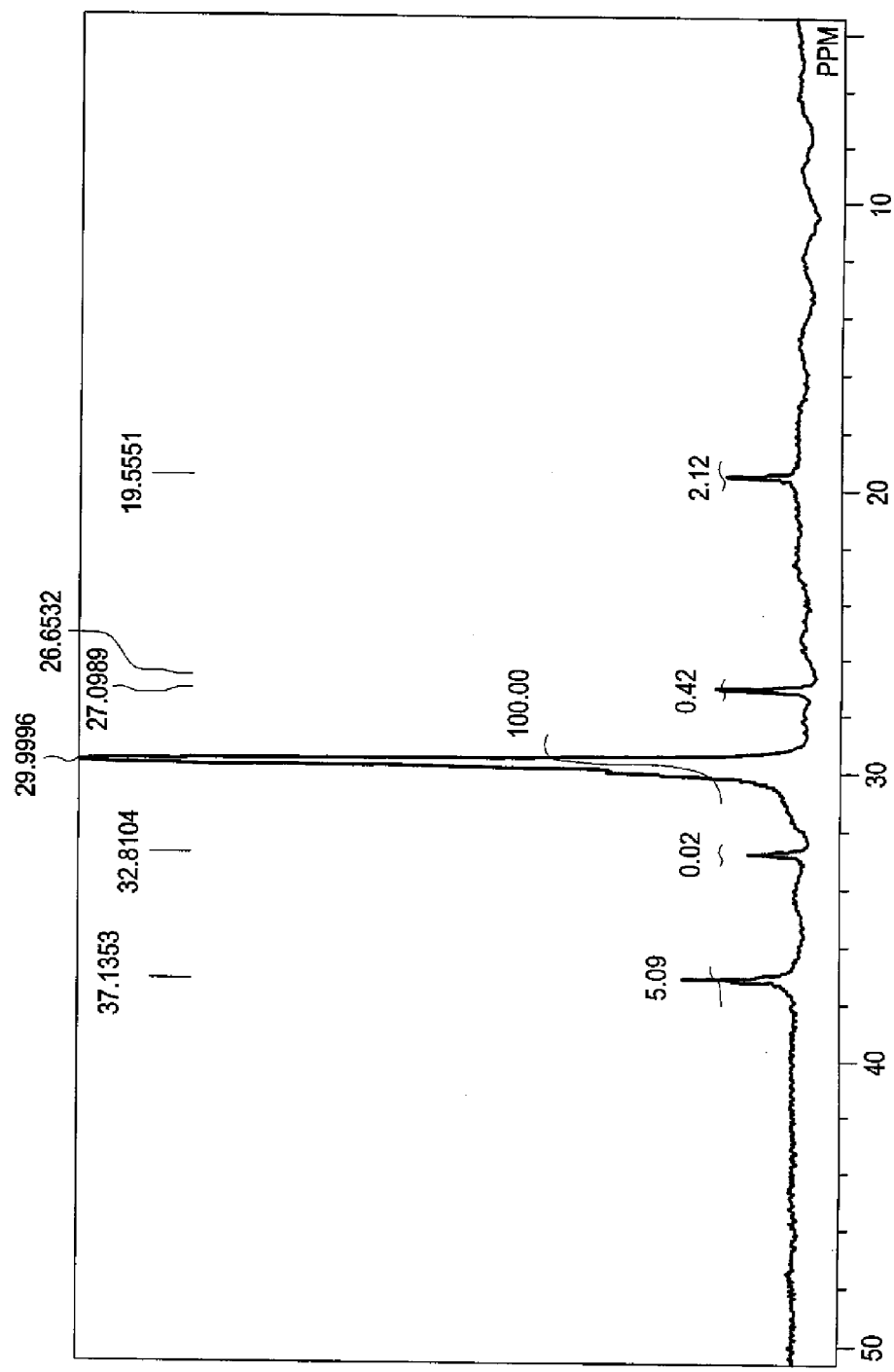
FIG. 1 is a plot illustrating the $^{13}C$ NMR spectra of an ethylene/propylene copolymer nanocomposite according to the present invention, made with a molar ratio of 50:50 ethylene:propylene and 15 mg. of $TiO_2$/Fe nanofiller (Entry 2 of Table 1).
Figure 2:
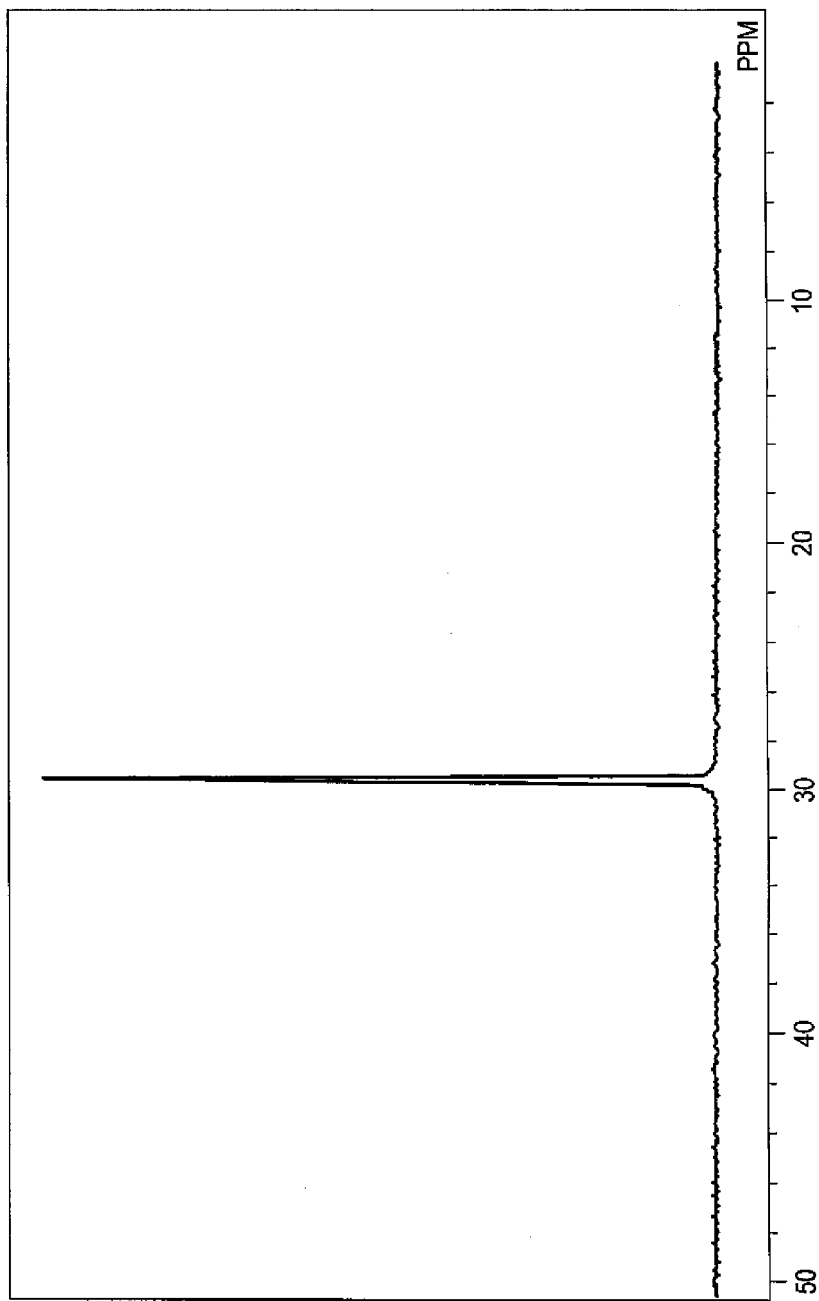
FIG. 2 is a plot illustrating the $^{13}C$ NMR spectra of a control sample prepared with a molar ratio of 50:50 ethylene:propylene, but with no $TiO_2$/Fe nanofiller added (Entry 1 of Table 1).
Figure 3:
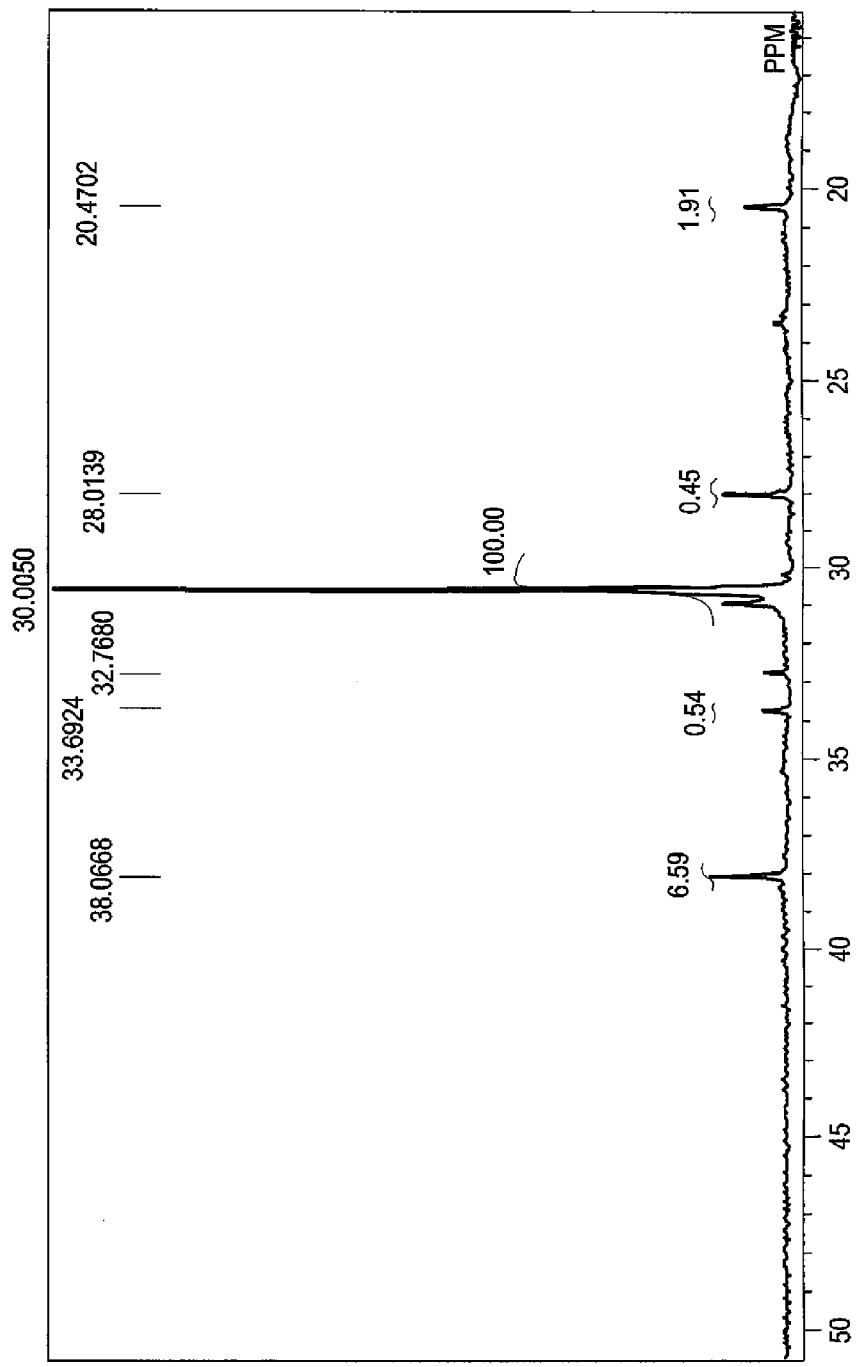
FIG. 3 is a plot illustrating the $^{13}C$ NMR spectra of an ethylene/propylene copolymer according to the present invention made with a molar ratio of 60:40 ethylene:propylene, but with no $TiO_2$/Fe nanofiller added Entry 3 of Table 1).
Figure 4:
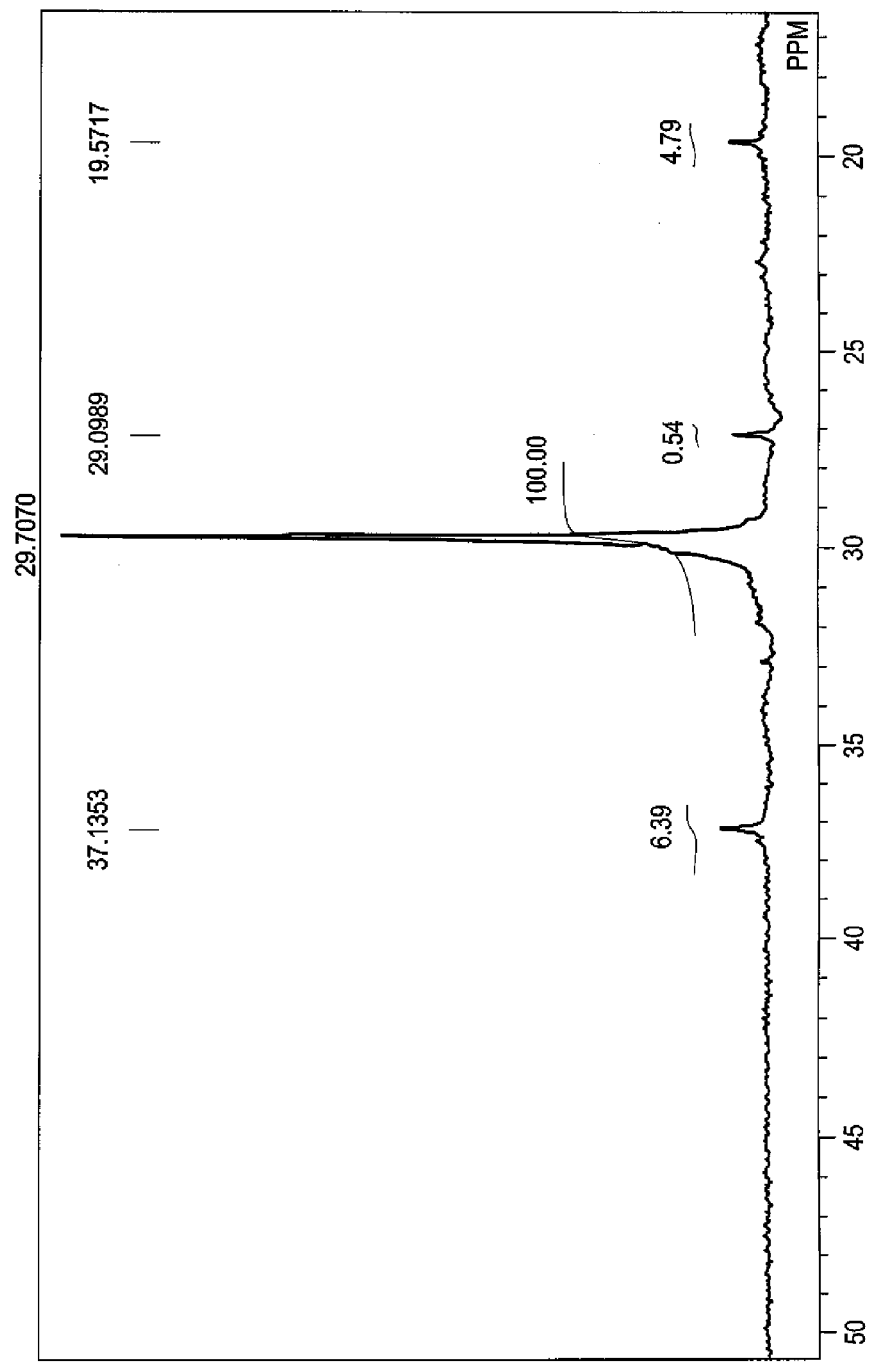
FIG. 4 is a plot illustrating the $^{13}C$ NMR spectra of an ethylene/propylene copolymer according to the present invention made with a molar ratio of 60:40 ethylene:propylene and 5 mg. of $TiO_2$/Fe nanofiller (Entry 4 of Table 1).
Figure 5:
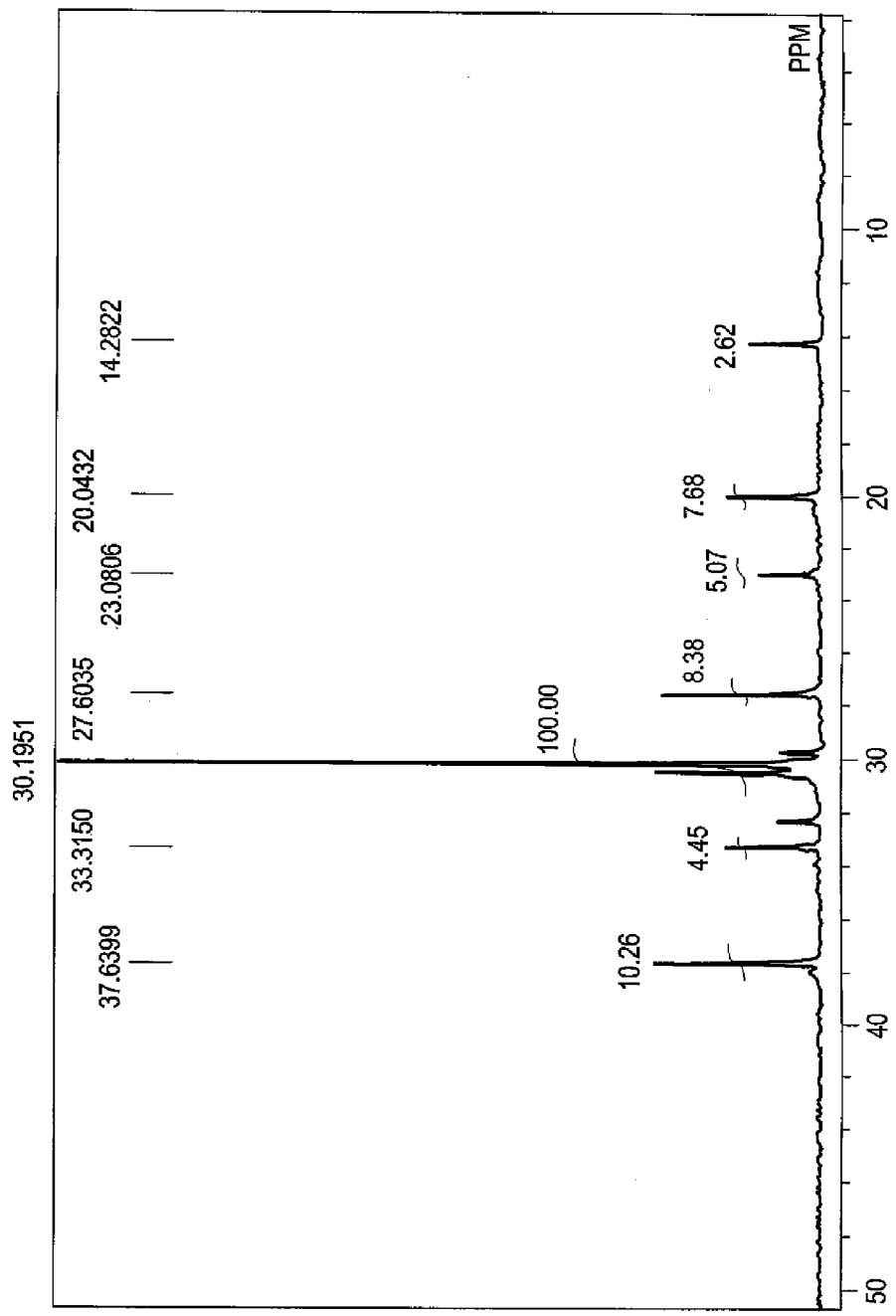
FIG. 5 is a plot illustrating the $^{13}C$ NMR spectra of an ethylene/propylene copolymer according to the present invention made with a molar ratio of 60:40 ethylene:propylene and 15 mg. of $TiO_2$/Fe nanofiller (Entry 5 of Table 1).

FIGS. 1 and 2 illustrate the $^{13}$C NMR spectra of the product of the ethylene/propylene copolymer nanocomposite synthesis with a titania-iron nanofiller prepared as above with an ethylene/propylene gas mixture having an ethylene to propylene molar ratio of 50:50 and 15 mg. of the TiO$_2$/Fe nanofiller used (Entry 2 in Table 1) and a control sample (Entry 1 in Table 1), respectively. FIGS. 3, 4 and 5 show the $^{13}$C NMR spectra for the Entries 3, 4, and 5 in Table 1, respectively. As can be clearly seen, the polypropylene concentration increases with the addition of the TiO$_2$/Fe nanofiller using the vanadium complex catalyst. The highest percent of polypropylene was obtained when 15 mg of TiO$_2$/Fe filler was used (the second and fifth entries in Table 1).

The $^{13}$C NMR spectra for the 50/50 molar ratio of ethylene/propylene in Entry 1 of Table 1 shows (the control sample with no nanofiller) that there was only homo polyethylene produced (shown in FIG. 2). However, the polypropylene percentage was increased to about 4.1% using only 15 mg of the TiO$_2$/Fe nanofiller, as shown in FIG. 1 (corresponding to the second entry in Table 1). (The percentage of polypropylene in the ethylene/propylene copolymers was computed by the method described by Cheng in "Carbon-13 NMR analysis of ethylene-propylene rubbers", Macromolecules, (1984), 17(10), pp. 1950-1955 from the $^{13}$C NMR spectra of FIGS. 1-5).

The overall polypropylene percentage was increased from 3.7% to 9.1% and 25% by using 5 and 15 mg of TiO$_2$/Fe, respectively, for a 60:40 molar ratio of E:P, as shown in Entries 3, 4, and 5 of Table 1, respectively, as well as being shown in FIGS. 3, 4 and 5, respectively.

Figure 6:
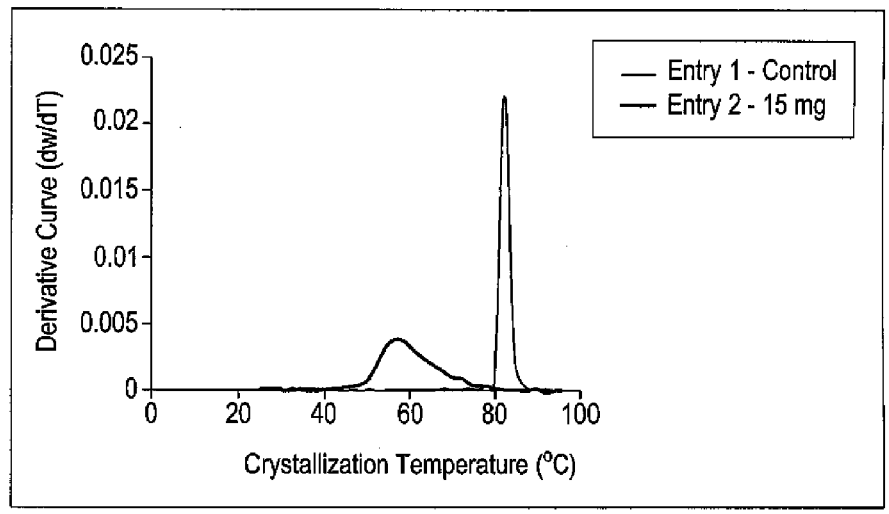
FIG. 6 is a plot illustrating differential crystallization analysis fractionation of the product of ethylene/propylene copolymer nanocomposite synthesis with a molar ratio of 50:50 ethylene:propylene with no nanofiller (Entry 1 of Table 1) and with 15 mg iron doped titania nanofiller (Entry 2 of Table 1).
Figure 7:
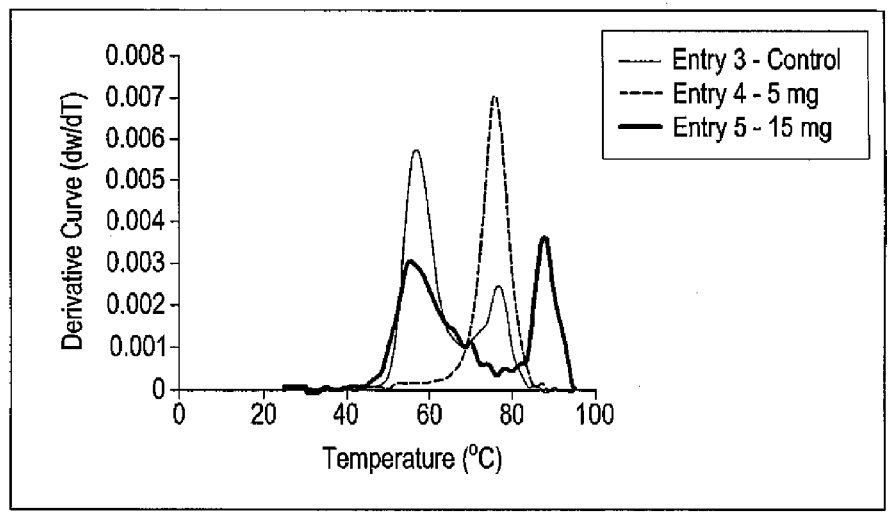
FIG. 7 is a plot illustrating differential crystallization analysis fractionation of the product of ethylene/propylene copolymer nanocomposite synthesis with a molar ratio of 60:40 ethylene:propylene with no nanofiller (Entry 3 of Table 1), with 5 mg of iron-doped titania nanofiller (Entry 4 of Table 1), and with 15 mg iron-doped titania nanofiller (Entry 5 of Table 1).

The percentage of crystallinity in the nanocomposite samples was determined using differential scanning calorimetry (DSC), and as shown in FIGS. 6 and 7, the percentage of crystallinity decreases when the amount of the filler increases. This can also be seen in Table 1, where the lowest percentage of crystallinity was obtained using 15 mg of the TiO$_2$/Fe nanofiller, compared against the control sample. The lowering of crystallinity is due to the increase in the polypropylene concentration in the copolymer.

Crystallization analysis fractionation was used to confirm the results obtained by $^{13}$C NMR and DSC. FIGS. 6 and 7 show that the crystallinity temperature decreases and the crystallization analysis fractionation profiles become broader when TiO$_2$/Fe is added, due to the increase in polypropylene concentration. The decrease in crystallization analysis fractionation peak temperature can be explained as the changing of the thermodynamic interaction parameter for the copolymer composition.

It is to be understood that the present invention is not limited to the embodiments described above, but encompasses any and all embodiments within the scope of the following claims.

We claim:
1. A method of making an ethylene/propylene copolymer nanocomposite, comprising the steps of:
   mixing nanoparticles of an iron-doped titanium dioxide filler with a polymerization catalyst in an organic solvent in a reactor to form a reaction mixture;

heating the reactor for a period of time sufficient to bring the reaction mixture to a polymerization reaction temperature;
feeding ethylene and propylene gases into the reactor;
adding methyl aluminum dichloride as a co-catalyst to the reactor to initiate in situ polymerization; and
quenching the polymerization.

2. The method of making an ethylene/propylene copolymer nanocomposite according to claim 1, further comprising the step of increasing the percentage of iron-doped titanium dioxide nanofiller in the reaction mixture in order to increase the percentage of polypropylene in the resulting copolymer.

3. The method of making an ethylene/propylene copolymer nanocomposite according to claim 1, further comprising the step of increasing the percentage of iron-doped titanium dioxide nanofiller in the reaction mixture in order to decrease the crystallinity of the resulting copolymer.

4. The method of making an ethylene/propylene copolymer nanocomposite as recited in claim 1, wherein the polymerization catalyst is a vanadium (III) complex with salicylaldiminato ligands having the formula:

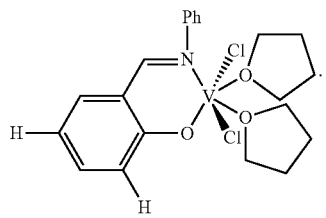

5. The method of making an ethylene/propylene copolymer nanocomposite as recited in claim 1, wherein the polymerization reaction temperature is about 30° C.

6. The method of making an ethylene/propylene copolymer nanocomposite as recited in claim 1, wherein the step of quenching the polymerization comprises adding methanol containing 5% hydrochloric acid by volume to the reactor.

7. The method of making an ethylene/propylene copolymer nanocomposite as recited in claim 1, wherein the nanoparticles of iron-doped titanium dioxide have a particle size less than 10 nm.

8. The method of making an ethylene/propylene copolymer nanocomposite as recited in claim 1, further comprising the step of removing nitrogen from the reactor prior to the step of feeding ethylene monomer into the reactor.

9. The method of making an ethylene/propylene copolymer nanocomposite as recited in claim 1, wherein said step of feeding ethylene and propylene gases into the reactor comprises feeding the gases into the reactor at a pressure of about 1.3 bar.

10. The method of making an ethylene/propylene copolymer nanocomposite as recited in claim 1, wherein said organic solvent comprises toluene.

11. The method of making an ethylene/propylene copolymer nanocomposite as recited in claim 1, wherein said step of feeding the ethylene and propylene gases into the reactor comprises feeding a mixture of ethylene and propylene gases having an ethylene:propylene molar ratio of 60:40 into the reactor.

12. An ethylene/propylene copolymer nanocomposite made according to the method of claim 1.

13. The method of making an ethylene/propylene copolymer nanocomposite as recited in claim 1, wherein iron forms about 1% by weight of said nanoparticle filler.

14. A method of making an ethylene/propylene copolymer nanocomposite, comprising the steps of:
mixing nanoparticles of an iron-doped titanium dioxide filler with a polymerization catalyst in an organic solvent in a reactor to form a reaction mixture, the polymerization catalyst being a vanadium (III) complex having the formula:

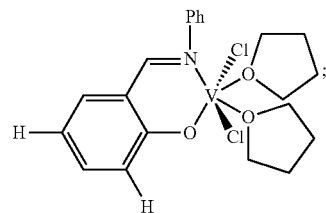

heating the reactor to a for a period of time sufficient to bring the reaction mixture to a polymerization reaction temperature;
feeding ethylene and propylene gases into the reactor;
adding methyl aluminum dichloride as a co-catalyst to the reactor to initiate in situ polymerization; and
quenching the polymerization.

15. The method of making an ethylene/propylene copolymer nanocomposite as recited in claim 14, wherein iron forms about 1% by weight of said nanoparticle filler.

16. The method of making an ethylene/propylene copolymer nanocomposite according to claim 14, further comprising the step of increasing the percentage of iron-doped titanium dioxide nanofiller in the reaction mixture in order to increase the percentage of polypropylene in the resulting copolymer.

17. The method of making an ethylene/propylene copolymer nanocomposite according to claim 14, further comprising the step of increasing the percentage of iron-doped titanium dioxide nanofiller in the reaction mixture in order to decrease the crystallinity of the resulting copolymer.

18. An ethylene/propylene copolymer nanocomposite made according to the method of claim 14.

19. An ethylene/propylene copolymer nanocomposite comprising a copolymer of ethylene and propylene having a filler of nanoparticles of iron-doped titanium dioxide.

* * * * *